United States Patent [19]
Renfroe et al.

[11] Patent Number: 5,660,412
[45] Date of Patent: Aug. 26, 1997

[54] HYBRID INFLATOR

[75] Inventors: Donald Renfroe; Roy G. Brown, both of Knoxville; David A. Bilbrey, Crossville, all of Tenn.; Richard L. Frantom, Richmond, Mich.; Steven L. Ludeke; Richard K. Robbins, both of Knoxville, Tenn.; Richard Husband, Farragut; James Rose, Knoxville, both of Tenn.

[73] Assignee: Bendix-Atlantic Inflator Company, Knoxville, Tenn.

[21] Appl. No.: 718,035

[22] Filed: Sep. 23, 1996

Related U.S. Application Data

[63] Continuation of Ser. No. 354,410, Dec. 12, 1994, abandoned.

[51] Int. Cl.⁶ .................................................. B60R 21/26
[52] U.S. Cl. .......................................... 280/737; 280/741
[58] Field of Search ............................. 280/737, 741, 280/742; 422/164–166

[56] References Cited

U.S. PATENT DOCUMENTS

| | | | |
|---|---|---|---|
| 3,641,935 | 2/1972 | Gawlick et al. | |
| 3,723,205 | 3/1973 | Scheffee | 280/741 |
| 3,731,843 | 5/1973 | Anderson, Jr. | |
| 3,817,263 | 6/1974 | Bendler et al. | |
| 3,833,029 | 9/1974 | Munn | |
| 3,895,821 | 7/1975 | Schotthoefer et al. | 280/741 |
| 3,951,428 | 4/1976 | Sugiura et al. | 280/737 |
| 3,966,226 | 6/1976 | Roth | 280/737 |
| 3,986,456 | 10/1976 | Doin et al. | 280/741 |
| 4,981,534 | 1/1991 | Scheffe | 280/741 |
| 5,005,486 | 4/1991 | Lenzen | 280/741 |
| 5,031,932 | 7/1991 | Frantom et al. | 280/737 |
| 5,242,194 | 9/1993 | Popek | 280/737 |
| 5,335,940 | 8/1994 | Cuevas | |
| 5,345,876 | 9/1994 | Rose et al. | |
| 5,348,344 | 9/1994 | Blumenthal et al. | |

FOREIGN PATENT DOCUMENTS

| | | |
|---|---|---|
| 0 512 747 A | 4/1992 | European Pat. Off. |
| 2 210 438 | 7/1974 | France |
| 2348834 | 6/1974 | Germany ......... 280/741 |
| 42 31 356 A | 4/1993 | Germany |
| 1 330 406 | 9/1973 | United Kingdom |
| WO94/08819 | 4/1994 | WIPO |

*Primary Examiner*—Paul N. Dickson
*Attorney, Agent, or Firm*—Markell Seitzman

[57] ABSTRACT

A hybrid inflator (20) comprising: a pressure vessel (22) including a central member (24) closed at ends by a first (28) and a second closure member (30), one of the closure members including a passage means (70) for introducing pressurized inflation gas into the pressure vessel and the other of the closure members including a breakable disk (34) in communication with at least one exit port (40); a pyrotechnic container (80), within the pressure vessel, secured at one end to one of the closure members (28) and including a plurality of vent openings (90) thereabout, a first quantity of pyrotechnic material (100), located within the pyrotechnic container for providing, at a first controlled gas generation rate, the primary source of heating the inflation gas in the pressure vessel, a second quantity of pyrotechnic material (102) located at least partially within the first quantity of pyrotechnic material characterized by a gas generation rate greater than that of the gas generation rate of the first quantity of material, for producing products of combustion that ignite the first quantity of material and wherein a portion of these products of combustion directly heat the inflation gas, an initiator (104) for igniting the second quantity of pyrotechnic material.

12 Claims, 3 Drawing Sheets

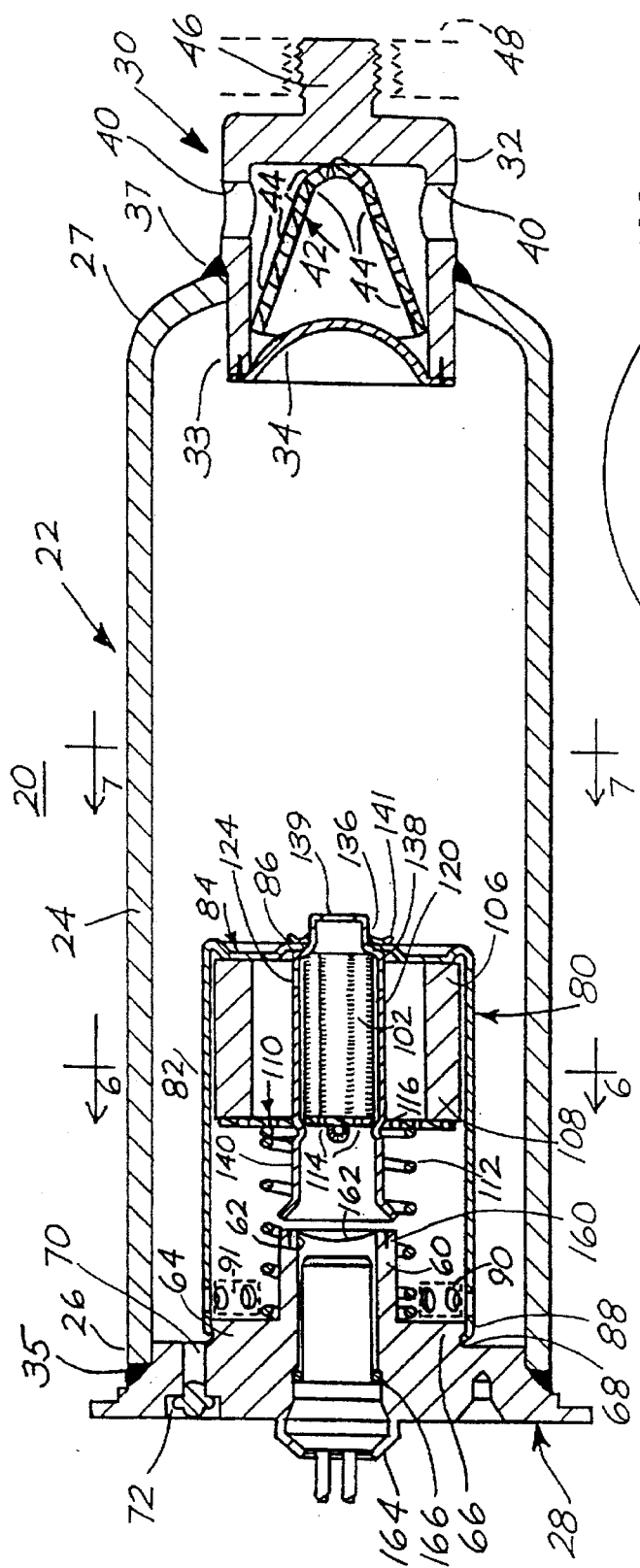
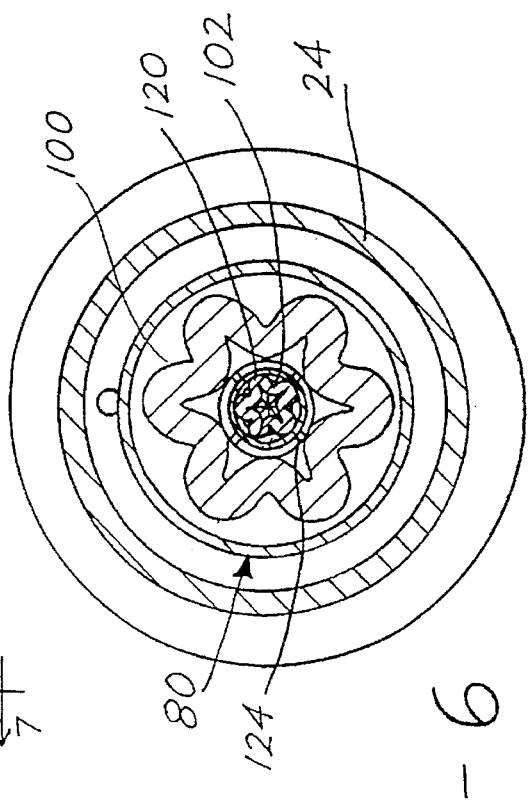
Fig-2
Fig-6

HYBRID INFLATOR

This application is a continuation of application Ser. No. 08/354,410 filed Dec. 12, 1994 now abandoned.

BACKGROUND AND SUMMARY OF THE INVENTION

The present invention relates generally to inflators or gas generators for air bags and more particularly, to a hybrid inflator.

U.S. Pat. No. 3,895,821 is illustrative of a hybrid inflator. As can be seen from this reference, the hybrid inflator includes a pressure vessel filled with a predetermined quantity of pressurized inert gas. One side of the pressure vessel is closed by a rupturable disk. Upon ignition of propellant, the gas pressure within the pressure vessel increases to a level sufficient to rupture the disk. Thereafter, heated gas exits one or more exit ports to inflate a nearby positioned air bag. U.S. Pat. No. 3,758,131 is illustrative of a second, though related type, of hybrid inflator in which two (2) propellant charges are placed within the pressure vessel. Depending upon the intensity of a crash, one or both propellant charges are ignited. The dual charges provide a greater degree of control of the rate at which gasses flow from the inflator and into the air bag. Each of the above patents includes an initiator, or squib which when activated by a control signal, starts the burning of the closely positioned propellant.

One deficiency of many hybrid inflators is that it takes a relatively long period of time for the pressure inside the pressure vessel to build up a level sufficient to burst the rupture disk leading to an exit port. In prior art inflators in which the generant is located in a propellant chamber that is at atmospheric pressure, the time it takes for the inflation gas to exit the inflator consists of the time needed to increase the pressure about the generant, that is within the propellant chamber, to a level in excess of the back pressure of the inflation gas (which typically acts on a seal disk, which typically isolates the propellant chamber from the pressure in the pressure vessel) and then the time needed for the gas to exit the propellant chamber and enter the pressure vessel. During this time the mass flow of the hot propellant gases must continue until the pressure in the pressure vessel reaches a level sufficient to break the burst or rupture disk allowing inflation gas to exit the inflator.

It is an object of the present invention to provide an improved hybrid inflator. Another object of the present invention is to provide a hybrid inflator in which the time from initiation to the bursting of the rupture disk is shortened while still retaining a controlled gas generation rate of the propellant.

Accordingly, the invention comprises: a hybrid inflator comprising: a pressure vessel including a central member closed at its ends by a first and a second closure member. One of the closure members includes a means for introducing pressurized inflation gas into the pressure vessel and the other of the closure members includes a breakable (rupture or burst) disk in communication with at least one exit port. A pyrotechnic container is provided, within the pressure vessel, and is secured at one end to one of the closure members and includes a plurality of vent openings about its wall. A first quantity or main charge of pyrotechnic material, is located within the pyrotechnic container for providing a first controlled gas generation rate. This main charge also provides the primary means of heating the inflation gas in the pressure vessel. A second quantity or secondary charge of pyrotechnic material is located at least partially within the main charge and is characterized by a faster gas generation rate than the gas generation rate of the main charge. This secondary charge produces products of combustion that ignite the first quantity or main charge of material. A portion of these products of combustion initially rapidly heat the inflation gas opening the burst disk. Means are provided for igniting the second quantity of pyrotechnic material.

Many other objects and purposes of the invention will be clear from the following detail description of the drawings.

BRIEF DESCRIPTION OF THE DRAWINGS

In the drawings:

FIG. 2 shows an alternate embodiment of the invention.

FIGS. 4 and 5 are cross-sectional views through the inflator of FIG. 1.

FIGS. 6 and 7 are cross-sectional views through the inflator of FIG. 2.

DETAILED DESCRIPTION OF THE DRAWINGS

Figure 1:
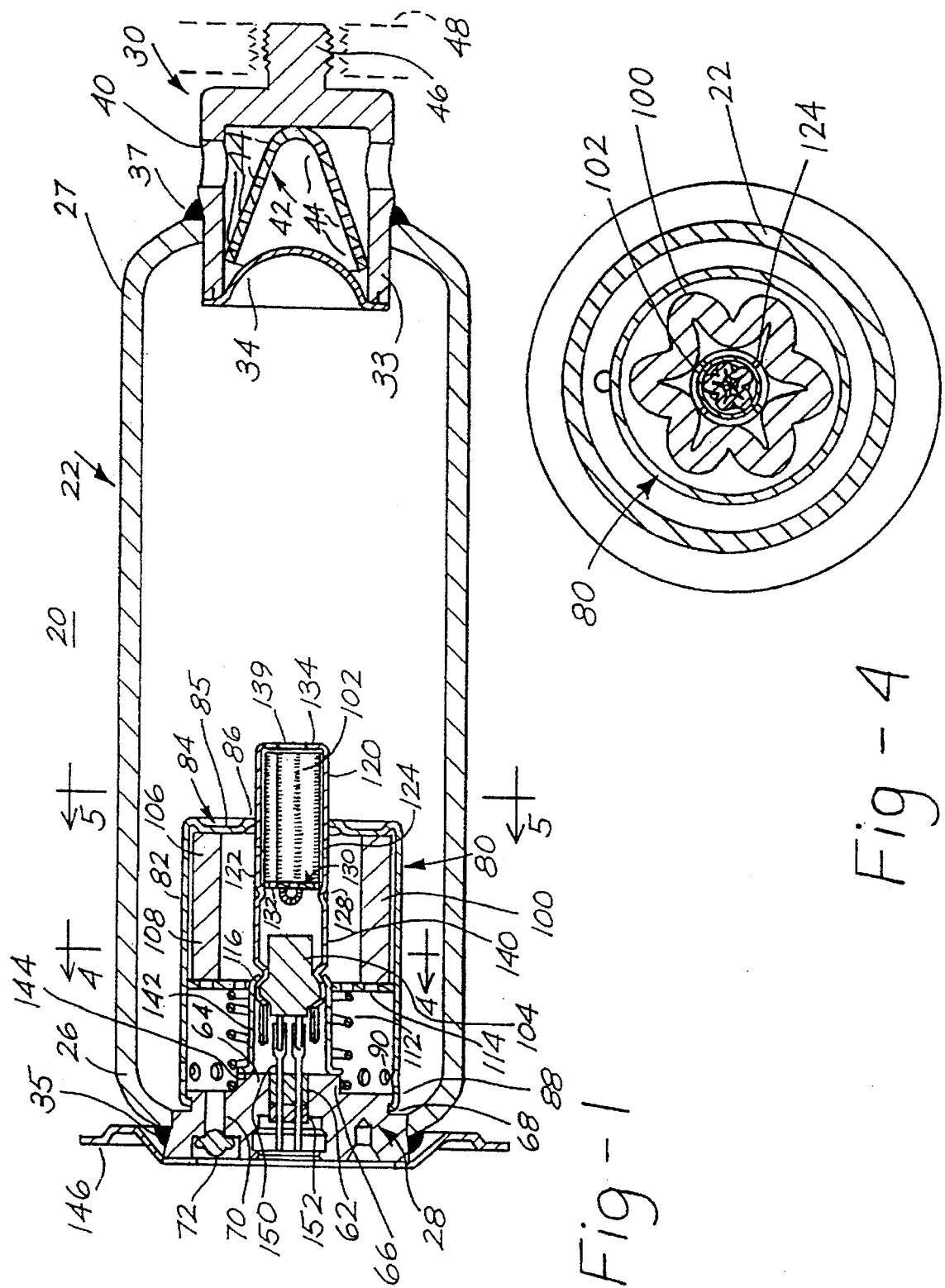
FIG. 1 illustrates a cross-sectional view of the present invention.

FIG. 1 shows a hybrid inflator 20 constructed in accordance with the present invention. The inflator 20 includes a pressure vessel 22 formed in part by a thin wall center member 24 such as a length of steel tubing, a first closure member 28 and a second closure member 30. Closure member 28 is welded to the member 24 at end 26 and closure member 30 is welded to member 24 at end 27. The circumferential welds between the closure members and center member are generally shown as 35 and 37. The second closure member 30 includes a cylindrically shaped, hollow manifold portion 32 having an open end 33 which extends into the pressure vessel. A rupture or burst disk, or diaphragm 34 is welded to the end 33 of the manifold 32. In FIG. 1 the disk 34 is shown bowed outwardly due to the internal pressure of the stored gas (typically a mixture of Argon and Helium). The manifold 32 further includes a plurality of exit ports or outlets 40 downstream of the disk 34. Situated between the disk and the exit ports 40 is a conically shaped particulate screen, filter or trap 42 made of a heat resistant material. The screen or filter 42 includes a plurality of small ports or orifices 42 sized to capture particulates in the exit gas stream while not small enough to restrict the flow of inflation gas out of the inflator into a closely placed air bag. The closure member 30 also includes a threaded mounting stud 46 to provide a means for attaching one side of the inflator to a nearby support structure.

Reference is again made to closure member 28 which includes a protruding boss 60 and a bore 62 extending therethrough. A ledge 64 extends radially outward from the base of the boss. A side wall 66 of the ledge 64 includes an annular groove 68. The closure member 28 further includes a fill bore or passage 70 through which the pressure vessel is filled with inflation gas and later closed by a plug 72 welded in a known manner.

Attached to closure member 28 is a main or first pyrotechnic container 80. Also attached to the closure member 28 is a mounting bracket 146 used to secure this end of the pressure vessel to a support structure. The pyrotechnic container 80 is cylindrically shaped having a side wall 82, and a bottom or end 84. End 84 includes at least one opening 86 facing toward the rupture disk 34 and a number of standoffs 85. An end 88 of the side wall 82 is crimped about the ledge 64 to secure the container 80 to the closure member 28. Other means of attachment such as threads or welds may be used. The container 80, near end 88 also includes a plurality of radially disposed openings 90.

Figure 5:
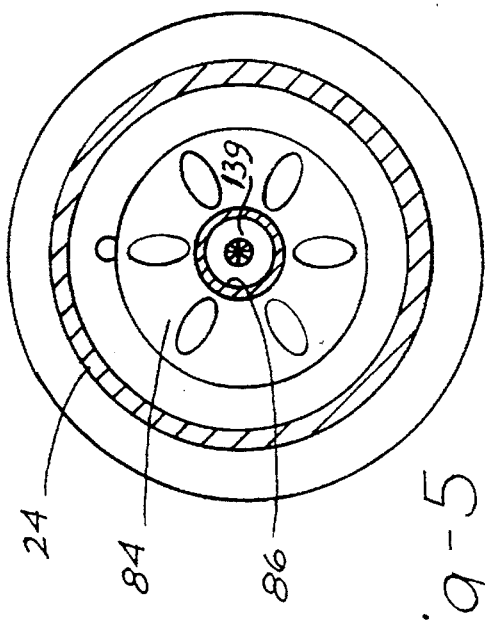

Situated completely or partially within the container 80 is a main charge or quantity of pyrotechnic material 100 and a second or ignition charge of pyrotechnic material 102. An initiator 104 is also provided. In the art, an initiator is often called a "squib". The main charge 100 is hollow and has a convoluted shaped, also see FIGS. 4 and 5. One end 106 of the main charge is biased against the stand offs 85 at the end 84. An annular washer member 110 bears against an opposite end 108 of the main charge 100. A bias spring 112 or other resilient member, such as a flexible foam, is received about the boss 60 and bears against the washer 110 urging the main charge 100 against the end 84. The washer 110 includes a plurality of openings 114 and a center hole 116. The flexible mounting provided by the resilient member 112 prevents relative motion of the propellant to its container if the inflator is subjected to vibration, shock or dropped and prevents structural damage to the pyrotechnic charge 104.

Figure 7:
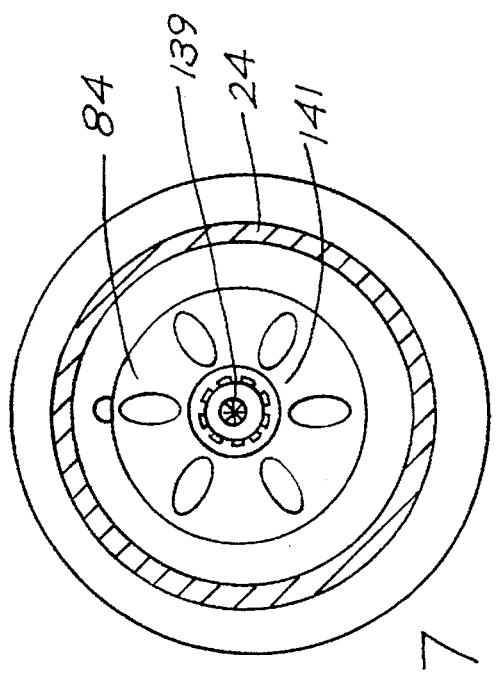

A second pyrotechnic container 120, formed of a thin wall metal tube, extends through the center hole 116 of the washer 110 and the opening 86 in the end 84 of the container 80. As can be seen from FIGS. 1 and 4 the second charge of pyrotechnic material 102 is located with this container and is partially supported by the convolutes of the main propellant charge 100. This second charge 102 has a convoluted shaped having a through bore 122 facing the opening 86. The second container 120 includes a plurality of openings or vents 124 in a wall 126 thereof. The openings 124 are preferably situated so that they are generally below the innermost end of the first charge 100. This feature allows the hot gases from the second container 120 flow over the surface of the main change 100 and improves heat transfer and enhance ignition of the main charge. The second container includes a plurality of crimps or inward dimples 128 that serve to entrap or position the pyrotechnic material 102 and an apertured washer 130, having openings 132, in the container 120. In the embodiment shown in FIG. 1 the end 134 of the second container 120 and pyrotechnic material 102 extend substantially through the end 84 of the main container 80 and the openings or vents 124 are located more toward the middle of the wall 122. In the embodiment of FIG. 2 the second container includes a narrowed section 136 and shoulder 138 that butts against end 84 and extends through opening 86. The narrowed end 136 is secured by a serrated washer 141. The shoulder 132 positions the pyrotechnic material 102 in the container 120. FIGS. 6 and 7 show various cross-sectional views of this inflator.

Returning to FIG. 1, the second container includes an extending part 140 in which is secured the initiator or squib 104. The initiator is positioned proximate the opening 116 in the washer 114. A tubular sleeve 142 extends from the boss 60 through the opening 116 and about the extending part 140 and assists in holding the second container in place. An end 144 of the sleeve 142 is welded to the boss 62. A plurality of electric leads 150 are fed through the bore 62 and sealed by a glass-to-metal seal generally shown as 152. The leads 150 communicate a control signal from an electronic control unit (not shown) or crash sensor to terminals of the initiator or squib 102 of known variety.

Returning again to FIG. 2 the extending part 140 of the second container 120 is spaced from the boss 60. Further, the boss 60 is larger than that used in FIG. 1 to accommodate the placement of the squib 104 outside of the pressure vessel in contrast to the embodiment of FIG. 1. A second burst or seal disk 162 closes bore 62 and is attached to an end 160 of the boss 60. The disk 162 provides a seal for the left end of the pressure vessel. The squib or initiator 104 is located in bore 62 upstream of the second burst disk 162. The closure member 28 may include an integral part 164 crimped about the squib to hold same thereto. A seal 166, such as an o-ring, may be provided to prevent gas leakage upon the opening of the disk 162. The squib 104 includes electrical terminals as shown.

In the preferred material, the main charge of pyrotechnic material 100 is Arcite, made by Atlantic Research Corporation, and is disclosed in U.S. Pat. Nos. 4,981,534 and 3,723,205 which are incorporated herein by reference. A benefit of using Arcite is that is can be extruded in and cut to any length depending on the specific application. The spring loading of the main charge 100 permits varying lengths of the material to be used without changing the structure of the inflator. The following is a general description of the characteristics of the main charge: weight 27 grams, wall thickness 5 mm, total burning area 740 sq. mm.

The second charge of pyrotechnic material 102 is also made of Arcite and can be formed as an extruded hollow cylinder with convoluted wall as shown or formed as a number of small particles, pellets or cylinders of the Arcite propellant. The purpose of using the convoluted wall or small particles, pellets etc., is to increase the exposed or burn surface area of this material to provide an intense, though short-lived, heat source when activated by the initiator 104 compared to that achieved by the material 100. In the preferred embodiment this charge 102 will have a weight of about 2.5 grams, a wall thickness of about 1.5 mm with a total burning area of about 1600 sq. mm.

Figure 3:
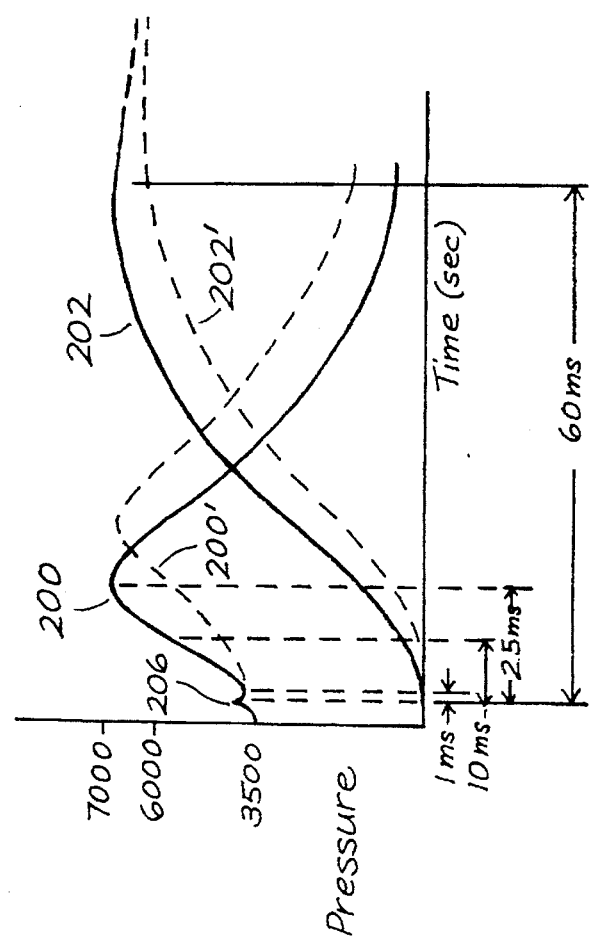
FIG. 3 shows pressure-time curves associated with a hybrid inflator.

Reference is made to FIG. 3 which shows two basic curves. The first curve 200 approximates the level of pressure within the pressure vessel 22 while the second curve 202 approximates the pressure within an inflating airbag. In reality this second curve is the pressure increase that would typically be achieved in a 100 liter test tank. FIG. 3 also contains curves 200' and 202' which show the pressure that would be generated in the pressure vessel and air bag were the second pyrotechnic charge 102 not used. FIG. 3 is also helpful in understanding the operation of the present invention. In response to a control signal, the initiator 104 is activated, thereby causing the increased surface area (particles/pellets or cylinders) of the Arcite propellant 102 to burn intensely. Point 206 of curve 200 illustrates the activation of the squib which typically occurs within a one millisecond interval from receipt of the control signal. The squib produces an intense flame which, in turn, causes the propellant 102 to burn rapidly. A portion of the products of combustion produced by the burning of the second charge 102 are directed through the opening 86 in the main container 80 to directly heat the inflation gas. The quantity of propellant 102 is chosen such that the pressure vessel's internal pressure rapidly increases from an ambient level of approximately 3500 to about 6000 psi (Kpi). After about a ten millisecond interval the propellant 102 is completely expended, however, the intense heat produced during its burning causes the pressure in the vessel to rise to a level to burst the disk 34 and initiate the burning of the larger quantity of propellant 100. The remaining products of combustion of the burning propellant 102 are vented through the side ports or vents 124 in the second container and contact and flow across the main pyrotechnic charge causing it to ignite and combust. The main charge of propellant 100 continues to burn to expand to stored gas which is communicated to an air bag. Thereafter as the now heated stored inflation gas exits the orifices 40 the pressure within the vessel 22 reduces to zero. Typical of inflators, it is desirable that the peak internal pressure vessel pressure reach its maximum within approximately twenty-five (25) milliseconds from the initiation of the squib 104. As can be seen from curve 202, the pressure within an adjoining air bag (test tank) continues to increase. Typically, it is desirable to achieve 80% of its final, or peak air bag inflation pressure within approximately forty (40) milliseconds from the activation of the initiator and to achieve its maximum value within sixty (60) milliseconds. With the air bag inflated in this manner, it will adequately protect the vehicle occupant. As can be appreciated, the internal pressure within the bag deflates or reduces rapidly after being impacted by the occupant. Curve 202 is abbreviated and does not show this final interval.

In the present invention the combined hot gases from the initiator and second charge are directed forward inside the main pyrotechnic container 80. The products of combustion of the initiator 104, charge 102 and the main charge 100 flow into the pressure vessel through the radial openings 90 in the container 80 causing additional heating of the stored inflation gas traveling the entire length of the pressure vessel insuring that all of the stored gas is heated. The rate at which combustion gases heat the inflation gas can be adjusted by the size and number of radial holes 90. In an alternate embodiment of the invention some or all of these holes may be temporarily blocked by a breakable seal to regulate the flow into the interior of the vessel. This breakable material 91 shown in phantom line could be the same material as used in to make the burst disk 34. The thickness of the material 91 covering each hole or set of holes can be varied to provide for the staged or sequenced opening of the holes 90 and a delayed flow rate to alter the air bag inflation rate as desired. Performance variations can be achieved by changing the granulation size, shape and quantity of the second charge 102 as well as the shape size and weight of the main charge 100. The time to peak pressure in the air bag can be varied by changing the outflow area of the exit ports 40.

In each embodiment of the invention the main pyrotechnic container 80 and the second container 120 are vented via vent opening 139 to allow the interior of each of these container to communicate with the interior of the pressure vessel and reside at the pressure of the stored gas. In simple terms the combustion products of the material 102 and 100 do not need to overcome a large pressure differential to burst a disk such as 162, as such a lower amount of pyrotechnic material is needed to achieve the rupture of the disk 34. In the second embodiment, the initiator 104 is not maintained at the pressure of the pressure vessel and is separated by the second disk 162, however, the volume surrounding the initiator is extremely small and very little propellant and time are needed to bring the pressure of this volume to a level to burst this second disk 162.

Many changes and modifications in the above described embodiment of the invention can, of course, be carried out without parting from the scope thereof. Accordingly, that scope is intended to be limited only by the scope of the appended claims.

We claim:

1. A hybrid inflator (20) comprising: a pressure vessel (22) having pressurized gas therein, including a central member (24) closed at ends by a first (28) and a second closure member (30), one of the closure members including means (70) for introducing the pressurized inflation gas into the pressure vessel and the other of the closure members including a breakable disk (34) in communication with at least one exit port (40);

an unsealed pyrotechnic container (80), within the pressure vessel including a plurality of vent openings (90) thereabout for permitting pressurized gas flow therethrough and to stabilize gas pressure interior thereto to the pressure exterior thereto, a first quantity of pyrotechnic material (100), located within the pyrotechnic container for generating products of combustion at a first controlled gas generation rate, as the primary means of heating the pressurized gas in the pressure vessel, a second quantity of pyrotechnic material (102) located at least partially within the first quantity of pyrotechnic material characterized by a gas generation rate greater than that of the gas generation rate of the first quantity of material, for producing products of combustion that ignite the first quantity of material and wherein a portion of these products of combustion provide for initial rapid heating of the pressurized gas causing the disk to rapidly open, and means (104) for igniting the second quantity of pyrotechnic material.

2. The device as defined in claim 1 wherein the vent openings are located proximate an end of the pressure vessel opposite the at least one exit port.

3. The device as defined in claim 1 wherein the means for igniting is located outside of the pressure vessel.

4. A hybrid inflator (20) comprising: a pressure vessel (22), having pressurized gas therein, including a central member (24) closed at ends by a first (28) and a second closure member (30), one of the closure members including a breakable disk (34) in communication with at least one exit port (40);

a pyrotechnic container (80), within the pressure vessel including a plurality of vent openings (90) thereabout, a first quantity of pyrotechnic material (100), located within the pyrotechnic container for providing, at a first controlled gas generation rate, the primary means of heating the pressurized gas in the pressure vessel, a second quantity of pyrotechnic material (102) located at least partially within the first quantity of pyrotechnic material characterized by a gas generation rate greater than that of the gas generation rate of the first quantity of material, for producing products of combustion that ignite the first quantity of material and wherein a portion of these products of combustion provide for the initial rapid heating of the pressurized gas causing the disk to rapidly open, and means (104) for igniting the second quantity of pyrotechnic material; wherein the second quantity of material is contained within a pyrotechnic housing (120) situated at least partially within and coaxial to the pyrotechnic container and to the first quantity of material, having a first vent opening (139) facing the interior of the pressure vessel through which the products of combustion flow to directly heat the inflation gas and a plurality of radially situated apertures (124) through which products of combustion flow to ignite the first quantity of material.

5. The device as defined in claim 4 wherein the plurality of apertures (124) are located proximate one end of the first quantity of material and proximate one end of the pyrotechnic container.

6. The device as defined in claim 5 wherein the first and second quantity of material are exposed to the pressure internal the pressure vessel.

7. The device as defined in claim 4 wherein the plurality of vent openings in the pyrotechnic container are opposite the first vent opening in the pyrotechnic housing.

8. The device as defined in claim 4 wherein the vent openings are located proximate an end of the pressure vessel opposite the at least one exit port.

9. The device as defined in claim 4 wherein the means for igniting is located outside of the pressure vessel.

10. A hybrid inflator (20) comprising: a pressure vessel (22) having pressurized gas therein, including a central member (24) closed at ends by a first (28) and a second closure member (30), one f the the closure members including a breakable disk (34) in communication with at least one exit port (40);

a pyrotechnic container (80), within the pressure vessel including a plurality of vent openings (90) thereabout, a first quantity of pyrotechnic material (100), located within the pyrotechnic container for providing, at a first controlled gas generation rate, the primary means of heating the pressurized gas in the pressure vessel, a second quantity of pyrotechnic material (102) located at least partially within the first quantity of pyrotechnic material characterized by a gas generation rate greater than that of the gas generation rate of the first quantity of material, for producing products of combustion that ignite the first quantity of material and wherein a portion of these products of combustion provide for the initial rapid heating of the pressurized gas causing the disk to rapidly open, and means (104) for igniting the second quantity of pyrotechnic material; and spring means (112,110) including a spring and a plate for biasing the first quantity of material against an inner end (84) of the pyrotechnic container.

11. The device as defined in claim 10 wherein the vent openings are located proximate an end of the pressure vessel opposite the at least one exit port.

12. The device as defined in claim 10 wherein the means for igniting is located outside of the pressure vessel.

* * * * *